United States Patent [19]

Osborn

[11] 3,996,863
[45] Dec. 14, 1976

[54] RAPID IGNITION OF FLUIDIZED BED BOILER

[75] Inventor: Liman D. Osborn, Alexandria, Va.

[73] Assignee: The United States of America as represented by the United States Energy Research and Development Administration, Washington, D.C.

[22] Filed: Mar. 15, 1976

[21] Appl. No.: 666,535

[52] U.S. Cl. .................. 110/28 J; 122/4 D
[51] Int. Cl.² ......................... F23D 19/00
[58] Field of Search .......... 110/28 J; 122/4 D; 34/57 A, 10; 432/58

[56] References Cited
UNITED STATES PATENTS

| | | | |
|---|---|---|---|
| 2,976,853 | 3/1961 | Hunter et al. | 122/4 D |
| 3,565,022 | 2/1971 | Bishop | 122/4 D |
| 3,881,857 | 5/1975 | Hoy et al. | 110/28 J |

Primary Examiner—Kenneth W. Sprague
Attorney, Agent, or Firm—Dean E. Carlson

[57] ABSTRACT

A fluidized bed boiler is started up by directing into the static bed of inert and carbonaceous granules a downwardly angled burner so that the hot gases cause spouting. Air is introduced into the bed at a rate insufficient to fluidize the entire bed. Three regions are now formed in the bed, a region of lowest gas resistance, a fluidized region and a static region with a mobile region at the interface of the fluidized and static regions. Particles are transferred by the spouting action to form a conical heap with the carbonaceous granules concentrated at the top. The hot burner gases ignite the carbonaceous matter on the top of the bed which becomes distributed in the bed by the spouting action and bed movement. Thereafter the rate of air introduction is increased to fluidize the entire bed, the spouter/burner is shut off, and the entire fluidized bed is ignited.

6 Claims, 2 Drawing Figures

RAPID IGNITION OF FLUIDIZED BED BOILER

BACKGROUND OF THE INVENTION

This invention relates to a fluidized bed boiler and to a method for the rapid ignition of the combustible fluidized bed.

A fluidized bed is a mass of discrete particles suspended in an enclosure by a flowing fluid stream. The fluid, which is commonly a gas, enters the enclosure through a porous bottom surface and passes upward through the particles. Individual particles are separated from one another and suspended in the stream so that the mass of fluidized particles resembles a high viscosity liquid. An overview of the theory and practice of fluidization is given in Kirk-Othmer, *Encyclopedia of Chemical Technology*, 2nd Edition, Volume 9 (1966), pp. 398–445.

Recently developed fluidized bed boilers employ oxidizing fluidized beds for heat generation. A bed of inert granular material within the boiler is suspended in contact with heat exchange surfaces by a stream of air. When the fluidized bed is heated above a critical ignition temperature and supplied with a mixture of air and coal, intense combustion occurs. High heat releases, and heat transfer direct from the bed material to the heat exchange surfaces enhance the efficiency of the boiler, reducing the dimensions required for a specified thermal output, in comparison with more conventional boiler designs.

When a fluidized bed boiler is activated, the mass of bed material must be heated above the fuel ignition temperature. For large beds, the mass of material involved makes simultaneous startup of the entire bed expensive and inefficient. Coal is difficult to burn in a fluidized bed until the bed is raised to a relatively high temperature. Using external burners to heat a bed to the coal burning temperature, an hour or more may be required. Fluidized beds, without heat exchangers installed, have been heated to combustion temperatures by firing with external burners from below or from above the bed. Depending on the size of the reactor, this may take several hours. Experimental fluidized bed boilers have been heated the same way. In small experimental fluidized bed boilers, a gaseous fuel has been burned within the bed for a rapid heating. However, there are no safe means to do this in a large fluidized bed boiler.

It has been proposed to start a bed in increments, using an already active portion to ignite an adjacent portion. One such method employs a bed with a divided air supply. Fluidizing air is first supplied to a small section of the bed, and after it ignites increasingly larger areas are fluidized, each area activating in turn by the effects of particle and fuel migration. A second method, described in U.S. Pat. No. 3,387,590, employs controllable ports in the partitions of a divided bed. After one area of the bed is activated, the ports leading to another area are opened so that bed material and fuel migrate to the inactive area. A modification of this second method, using continuously open ports in association with the normal operating characteristics of the bed to eliminate the need for mechanical controls is shown in U.S. Pat. No. 3,736,908. U.S. Pat. No. 3,769,922 shows preheating a bed by passing a stream of preheated gas downwardly therethrough until it is sufficiently heated and then fluidizing the bed with an upwardly flow gas stream.

SUMMARY OF THE INVENTION

In the present invention, a fluidized bed boiler is started up by directing hot gas stream such as a high velocity flame from a burner, at the upper portion of a bed of particulate solids containing carbonaceous material. An angular direction and velocity of the gas stream is selected to cause spouting in the bed. "Spouting" is the term given to a fluidization phenomenon which occurs when a gas stream of suitable velocity is introduced into a bed of particulate. Along the central gas channel or spout there is a dilute fluidized phase which is surrounded by a solid moving bed or particulates. For a fuller discussion of spouting, see Leva, "Fluidization", McGraw-Hill publishers, New York, 1959, chapter 7.

Oxygen-containing gas is admitted into the bottom of the bed at a rate insufficient to fluidize the entire bed. As a result of the spouting action and the gas flow through the bed, three main regions of particle flow and gas penetration are generated. In the vicinity of the spouter region there is least resistance to air flow through the bed. At the region adjacent this, resistance is greater and localized fluidization is present, while at a region farthest from the spouting region the resistance is highest and the bed is static. Between the static bed and the fluidized region there exists a mobile interface where the particles have motion.

At the spouter region, a stream of particles is thrown up continuously and these are deposited in a conical pile on a farther portion of surface of the bed soon giving the entire surface a conical shape. Due to the classifying action of the gas stream transporting the particles, the carbonaceous granules are located largely at the top of the pile. These ignite and the upper portion of the bed becomes a mass of burning carbonaceous granules. The latter become distributed through at least a substantial part of the bed by the spouting action, the mobile interface and fluidized portion and the bed becomes sufficiently heated in short order. Thereafter, the rate of flow of oxygen-containing gas is increased to fluidize the bed, the spouter burner is shut off, and the fluidized bed achieves a burning state.

It is therefore the overall object of the invention to provide a simple, effective and rapid means for starting up a fluidized bed boiler.

It is a more specific object of the invention to provide a means for starting up a fluidized bed boiler by steps comprising directing a jet of hot combustion gas into a bed of combustible particulate matter causing a spouting action and admitting oxygen-containing gas into the bed.

It is a further object to start up a fluidized coal boiler by directing a burner into the upper portion of a combustible bed to cause spouting to occur, admitting air into the bed at a rate insufficient to fluidize the entire bed and then increasing the rate to fluidize the bed.

Further objects will become apparent from the following specification and claims.

DESCRIPTION OF THE PREFERRED EMBODIMENT

Figure 1:
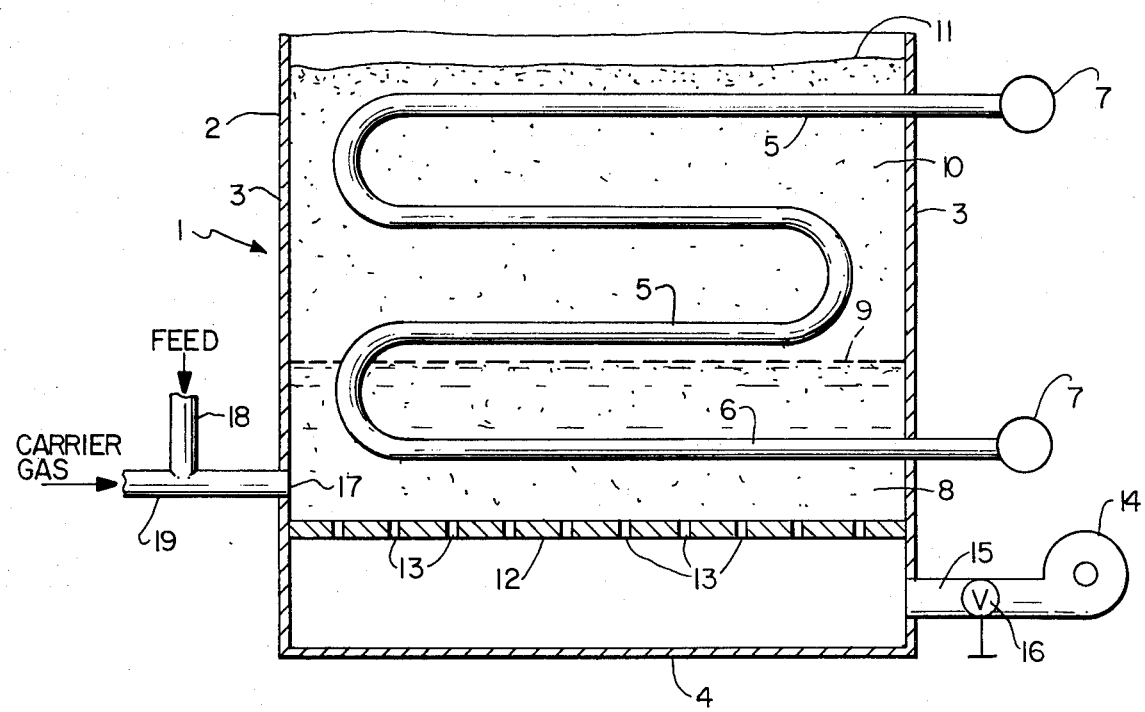
FIG. 1 is a schematic and partial section of a fluidized bed boiler.

In FIG. 1, a fluidized bed boiler 1 incorporating design detail well known to the art is shown having an enclosure 2, vertical side walls 3 and a horizontal base 4. Within the enclosure carbonaceous fuel undergoes combustion with air. The heat generated thereby is transferred through heat exchange surfaces 5 to a working fluid flowing through conduits 6 within the boiler. Conduits 6 are connected to headers 7 whereby the working fluid flows through one header into the conduits and leaves through the other in a heated state.

The combustion zone of the boiler comprises a bed of inert particles which can be suspended in a fluidized state by a gas stream. The bed in a static state is shown at 8 and has a top surface 9. On fluidization, it expands to bed 10 having a surface 11. Bed 8 rests on a perforated distribution grid 12 having a plurality of spaced perforations 13 and is spaced above base 4. Fan 14 furnishes combustion air to the bed at a fluidizing velocity through line 15 having damper 16 therein for control purposes.

Particulate carbonaceous fuel enters the boiler through port 17 and may be injected therein mechanically or pneumatically by means well known to the art. In the embodiment shown in FIG. 1, the crushed fuel passes through line 18 into a carrier gas flowing through line 19 and enters the boiler as shown. While only one port and injection means are shown, it is obvious that a plurality may be employed as a matter of choice and design.

Crushed coal is the fuel which would be most generally employed. However, other carbonaceous fuels such as oil shale, cellulosic materials, etc., are comtemplated as well.

Figure 2:
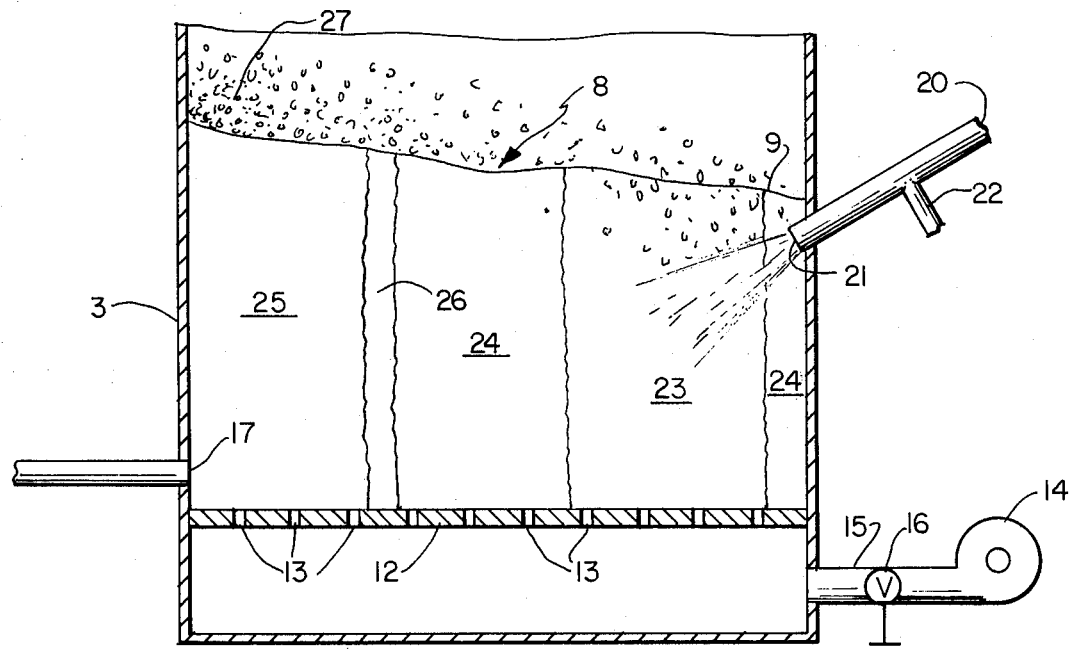
FIG. 2 is similar to FIG. 1 with the heat transfer tubes omitted for the sake of clarity to better show the startup operation.

For startup purposes, there is provided a burner 20 which projects through side wall 3 at an angle, as shown in FIG. 2, at about the level of the top 9 of the static bed 8. Liquid or gaseous fuel enters burner 21 via line 20 and air is admitted via line 22.

The startup operation is best described in conjunction with FIG. 2 which omits certain features in FIG. 1 not essential for this purpose. A high velocity flame from burner 21 is started in static bed 8 which contains inerts and coal granules. The angle of the hot gases, their exit velocity and the position of the burner relative to the bed is such that a portion of the bed is spouted. Oxygen-containing gas, e.g. air, is introduced into the base of the bed via distribution grid 12 and perforations 13. The rate of air introduction is below the amount needed to fluidize the entire bed in the cold condition.

As a result of the spouting condition at region 23 near the burner, the bed has there the least resistance to air flow. Thus the air flows preferentially through the spouted region. Surrounding the spouted region 23 are regions 24 of greater resistance to air flow than in 23, the rate of air flow in 24 being such that the solids there are in a fluidized condition. Beyond 24 is region 25, where the resistance to air flow is the greatest and which is in a fixed or static bed condition. At the interface between static region 25 and fluidized region 24 is a region 26, where the mass is mobile.

Coal mixed with inert granules are spouted out of the bed and thrown into a surface of the bed at an area removed from the burner. Because the spout is small when compared with the entire bed mass, the fixed bed 8 takes on a conical shape as a result of the spouted material being deposited thereon. Coal particles tend to concentrate at the top of the bed due to the classifying action of the gas stream on the thrown particles. Some particles ignite in the burner flame and are thrown on the concentration of coal particles atop the bed. The entire top surface of the bed rapidly becomes a burning mass of coal particles which provides the energy to heat the bed mass. In short order, the burning particles become distributed in the mass by the action of the top of the bed constantly flowing down into the spout, and the bed movements at the mobile interface and fluidized regions. When the bed is sufficiently warmed it is then fluidized by opening the damper 16, and the entire mass is raised quickly to operating temperature.

While this invention has been specifically described in relation to the startup operations of a coal fluidized bed boiler, of a specification, it may be practiced with any suitable fluidized bed boiler. Nor is the practice of this invention limited to a fluidized bed combustion system, and it may find application for a variety of fluidized bed reactions.

What is claimed:

1. A method for starting up a combustion fluidized bed which comprises:
    maintaining a bed of granular solids comprising carbonaceous particles mixed with inert particles at the lower end of a fluidized bed combustion vessel having a fluidizing gas distribution grid;
    spouting the bed at a portion thereof by directing a stream of hot gas above the combustion temperature of the carbonaceous particles at the upper portion of the bed at an effective gas velocity and angular direction;
    introducing oxygen-containing gas into the bed through the fluidized gas distribution grid at a rate insufficient to fluidize the entire bed of granular solids;
    transferring granular solids by the spouting action to the top of the bed to form a conical pile thereon, with the carbonaceous particles being concentrated at the upper portion of the pile;
    igniting the carbonaceous particles in the pile by the hot gas whereby the upper surface of the pile becomes a mass of burning coal particles;
    distributing the burning coal particles through a substantial part of the rest of the bed of solid granules to heat the bed to the point where fluidized combustion can be started;
    cutting off the flow of hot spouting gas into the combustion vessel; and
    increasing the flow of oxygen-containing gas through the fluidizing gas distribution grid to fluidizing conditions over the entire bed to achieve fluidized combustion.

2. The method of claim 1 wherein the carbonaceous particles comprise coal.

3. The method of claim 2 wherein the oxygen-containing fluidizing gas is air.

4. The method of claim 3 wherein the stream of hot gas adapted to spout a portion of the bed comprises burner emitting a high velocity flame.

5. The method of claim 4 wherein the air flow admitted into the bed at below the fluidizing rate passes through the bed at the greatest flow rate in a first region near the spouting area, at a lower flow rate at a second region adjacent the spouting area and acts to fluidize the bed in said second region, and at the lowest flow rate in a third region farthest from the spouting area, wherein the bed remains static, the interface between the second and third regions comprising a mobile bed.

6. The method of claim 5 wherein the burning coal particles are drawn into and mingle with the bed by the spouting action and by tthe movements of the bed induced by the air flow admitted into the bed at below the fluidizing rate.

* * * * *